United States Patent [19]

Morse

[11] Patent Number: 4,894,299

[45] Date of Patent: Jan. 16, 1990

[54] CELL HAVING A DOME-SHAPED SOLID CERAMIC ELECTROLYTE

[75] Inventor: Elliott M. Morse, Joplin, Mo.

[73] Assignee: Eagle-Picher Industries, Inc., Cincinnati, Ohio

[21] Appl. No.: 279,035

[22] Filed: Dec. 2, 1988

[51] Int. Cl.$^4$ ............................................. H01M 6/20
[52] U.S. Cl. ..................................... 429/104; 429/210
[58] Field of Search ................ 429/104, 210, 209, 191, 429/193

[56] References Cited

U.S. PATENT DOCUMENTS

| 4,188,463 | 2/1980 | Arcuri, Jr. | 429/104 |
| 4,360,575 | 11/1982 | Brennan | 429/104 |
| 4,405,696 | 9/1983 | Fischer et al. | 429/104 |
| 4,659,638 | 4/1987 | Roze et al. | 429/104 |

OTHER PUBLICATIONS

The Sodium Sulfur Battery by J. L. Sudworth and A. R. Tulley, published 1985–Chapman and Hall.

Primary Examiner—Anthony Skapars
Attorney, Agent, or Firm—Wood, Herron & Evans

[57] ABSTRACT

In an electrochemical cell of the type having a solid ceramic electrolyte between its anode and cathode, the electrolyte is dome-shaped, in the form of a thin curved shell of ceramic material such as a beta alumina. The domed configuration of the electrolyte reduces the weight that is required to withstand internal pressure differential generated across the electrolyte in discharge, and also reduces internal resistance of the cell.

15 Claims, 1 Drawing Sheet

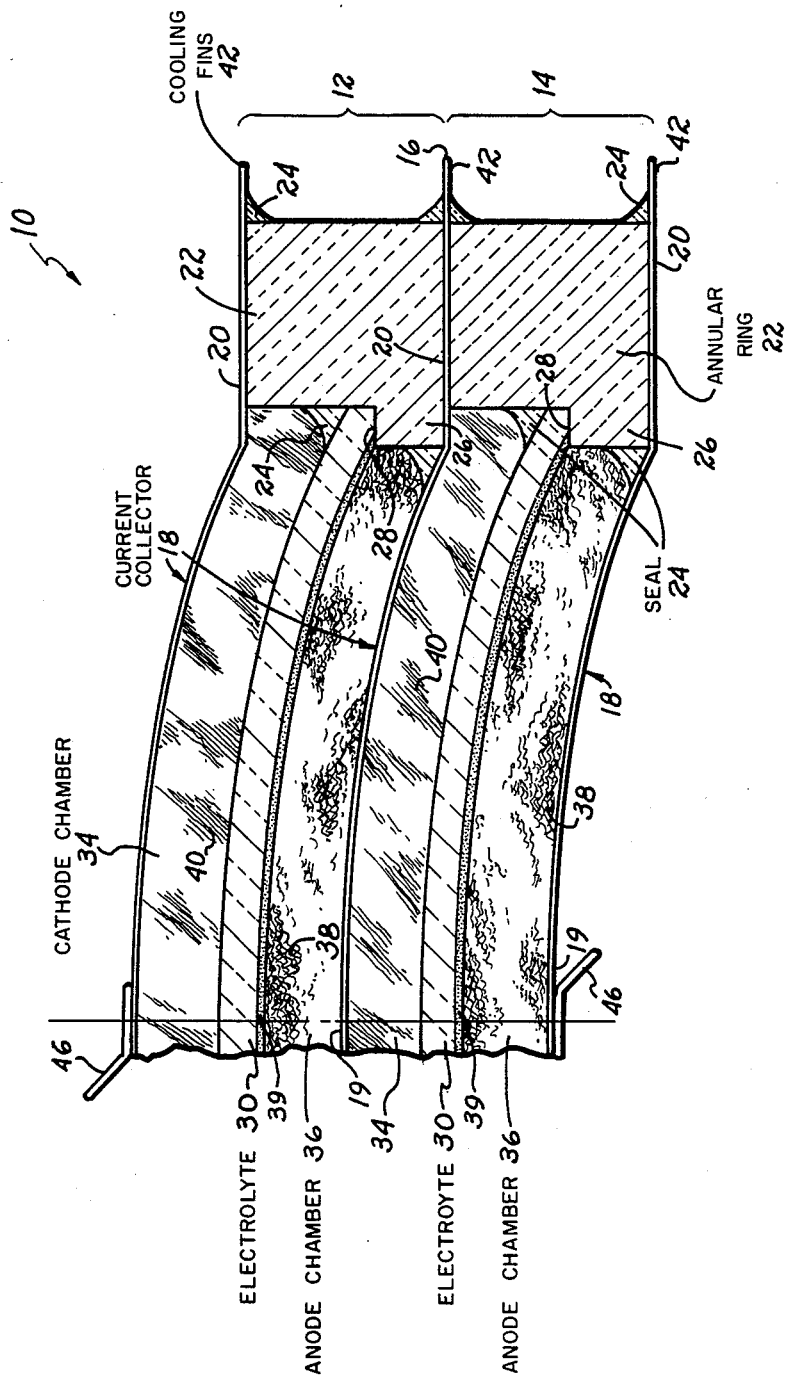

CELL HAVING A DOME-SHAPED SOLID CERAMIC ELECTROLYTE

FIELD OF THE INVENTION

This invention relates to cells and batteries of the type in which the electrolyte is a solid ceramic, for example, sodium-sulfur cells in which the electrolyte is beta alumina.

BACKGROUND

Sodium-sulfur ("Na/S") cells and batteries have a high specific energy and a high specific power, and are based on active materials which are relatively abundant and of low cost. They are rugged and reliable, and are used, for example, in applications such as satellites and electrically powered vehicles. The conventional sodium-sulfur cell is cylindrical in construction, with a cylindrical closed-end tube of solid electrolyte separating the cell cylinder into two annular chambers, one for anode material and one for cathode material. Another design is the voltaicpile design in which a flat conductive plate separates each cell and the solid electrolyte separates the anode chamber from the cathode chamber. In the flat plate design the sodium anode material and the sulfur cathode material are carried on inert porous conductive meshes, wools or pads, in electrode chambers that are separated by the solid electrolyte.

Sodium sulfur cells are operated at temperatures at which the sodium and sulfur are both liquid, typically about 300° to 400° C. In operation, sodium ions are transferred across the electrolyte, from the anode chamber to the cathode chamber during discharge. (In charging, Na+ ions are transported in the reverse direction, back to the anode chamber.) The material of choice for the ionically conductive electrolyte of a Na/S battery is so-called beta double prime alumina ($b''$-$Al_2O_3$), which has Na+ ions in its crystal structure. In discharge, sodium ions from the anode material enter the crystal lattice of the beta alumina on the anode side of the electrolyte and displace other such ions from the cathode side, into the cathode chamber where they react with the sulfur to form sodium sulfide. Metallic sodium atoms do not move physically through the electrolyte from one side to the other, however, sodium ions are transferred across the electrolyte: as some ions enter on one side, others are released essentially simultaneously on the opposite side.

THE PROBLEM IN THE ART

In sodium-sulfur and other cells having a solid electrolyte, wherein ions are transferred from a chamber containing one active material through the electrolyte to a separate chamber containing another active material, the ion transfer has the effect of progressively reducing the amount of material in one chamber and simultaneously increasing the amount in the other chamber as discharge proceeds. Because both the anode and the cathode material are contained in sealed chambers of fixed volume, the transfer of material from the one chamber to the other tends to cause an increasing pressure differential across the rigid electrolyte. In the Na/S cell the amount of anode material decreases and the amount of cathode material increases, so that increasing force acts on the electrolyte, toward the anode side. In deep discharge, the electrolyte experiences a substantial pressure force which is directed from the cathode side toward the anode side. Solid ceramic electrolyte materials such as beta alumina are relatively brittle and rigid, and are thus poorly adapted to withstand forces which tend to bulge them and thereby place one side of the electrolyte in tension. If the electrolyte cracks, the sodium can directly contact the sulfur and cause the battery to fail. It has therefore previously been necessary to make such electrolytes relatively thick in proportion to their area, in order to withstand the maximum expected pressure differential force. This in turn increases the volume and weight of the battery; moreover, it increases internal resistance, because such solid ceramic electrolytes are relatively poor conductors of current.

The Prior Art

A. R. Tilley, in *The Sodium-Sulfur Battery*, 1985, at pages 132 and 133, describes prior art configurations for Na/S cells. In the so-called "flat plate" construction, the electrolyte is in the form of a disc of beta alumina which is "glassed" (i.e., sealed) to an outer ring of alpha alumina. The outer ring acts as an electrically insulating component, and seals to it are made to close the sodium anode and sulfur cathode chambers. When several such cells are stacked to form a battery, adjacent cells in the stack are electrically connected by conductive current collectors which also function as intercell connectors; no external intercell connections are necessary in the resulting bipolar battery. Tilley states that the flat plate construction is relatively inferior to a tubular cell design in respect to sealing and mechanical strength of the beta alumina electrolyte. The capacity of the cell is stated to be proportional to the square of the electrolyte diameter for a given sulfur electrode thickness. A practical battery is indicated as desirably having a disc size of at least 80 millimeters (3.15") diameter for a reasonable specific energy, and the optimum diameter may be as high as 250 millimeters (9.84"). Reducing the thickness of the beta alumina separator is said to give the greatest improvement in performance, by reason of the reduction in internal resistance. However, large diameter, thin section beta alumina disks are stated to be unable to withstand quite small pressure differentials. Moreover, sealing techniques such as compression seals or thermocompression seals cannot be used with large diameter plate cells because of the inherent weakness of the thin section alpha alumina sealing rings. These problems are said to have halted the development of the flat plate cell configuration.

In the tubular cell design, Tilley states that the sodium anode material is situated inside a cylindrical beta alumina tube (central sodium) or outside the tube (central sulfur), around which a second tube contains the other electrode material. Designs having the sodium at the center have the advantage of requiring smaller diameter beta alumina tubes than the central sulfur design. Multitubular designs are said to be difficult to construct; all the practical cells are stated to be single tube designs.

A conical cell design has also been suggested, in which the electrolyte is in the form of a cone, the tip of which points toward the anode side. The design was said to be less subject to buckling instabilities.

There still remains a need for a more efficient construction which will overcome the disadvantages of the foregoing designs.

Brief Description of the Invention

In accordance with this invention a cell is provided wherein an ionically conductive solid ceramic electrolyte, and current collectors on each side of the electrolyte, are all in the form of circular discs having a uniformly curved or "domed" configuration. By "domed" is meant that the surface of each approximates a circular section of a sphere.

Each individual cell comprises, in sequence, a first domed current collector which forms one side of an anode chamber or compartment; anode material contained in the anode chamber; a domed solid ceramic electrolyte which closes the other side of the anode compartment; cathode material contained in a cathode compartment on the other side of the electrolyte; and a second domed current collector which closes the opposite side of the cathode chamber. Either or both current collectors can also serve as intercell connectors to adjacent cells in a stack to form a battery. The collectors are preferably domed with the same curvature as that of the electrolyte so that hemispherically curved, shell-like chambers of uniform thickness are defined for the anode and cathode material, between the electrolyte and the respective current collectors. In a Na/S cell the dome of the electrolyte preferably faces toward the cathode chamber, and the current collectors are similarly oriented. The preferred electrolyte for such a cell is beta" alumina, which contains a small proportion, e.g., 5-15%, of sodium ions in its crystal structure.

Other couples for which this construction is useful are those in which the cathode is nickel chloride ($NiCl_2$) or iron chloride ($FeCl_3$), preferably including a proportion of sodium tetrachloroaluminate ($NaCl \cdot AlCl_3$) to improve cathode conductivity.

DESCRIPTION OF THE DRAWING

The invention can best be described by reference to the accompanying drawing, which is a partial longitudinal section of a bipolar or stacked pair of Na/S cells, each in accordance with a preferred form of the invention.

DETAILED DESCRIPTION

FIG. 1 shows a Na/S battery designated generally by 10 which comprises a bipolar stack of two cells designated by 12 and 14, internally connected by an intercell connector 16 between them. Each cell 12 and 14 includes first and second current collectors 18 (a total of three such elements 18 being shown in the drawing), each having a thin, partially spherical or "oil-can" domed configuration. Each collector 18 is made of a material which resists corrosion of the active material (described below) which is adjacent to it. Suitable for this purpose are unreactive metals, carbon, carbon composites, and other electrically conductive materials which are inert to the anode and cathode materials. The current collectors can also be made of an electronically conductive ceramic such as rutile ($TiO_2$) or other ceramic material which is sufficiently conductive to collect and conduct the current from the adjacent anode and/or cathode chamber. Each current collector 18 has a flat planar edge or flange 20 which extends radially outward from it, around its domed center portion 19. The edge flange 20 is sealed to or between one or more annular mounting rings 22, each of which is made of an electrically insulating material such as alpha alumina. The seal between the edge flange 20 of the current collector and the mounting rings 22 can be a glass-to-metal seal 24.

The topmost current collector 18 of the battery shown in FIG. 1 is sealed to a single mounting ring 22; the current collector which is between the two cells 12 and 14 (and which also comprises the intercell connector 16 between those cells), is abutted on its upper and lower faces by two mounting rings 22, 22. Each mounting ring is an annulus and has an inwardly projecting circular lip or rib 26 adjacent its inner a radial face. A shoulder or corner 28 is presented between lip 26 and the body of ring 22, and provides an abutment against which the circular domed electrolyte 30 is positioned and seated. The electrolyte is sealed to the ring 22, and the two reinforce and support one another. Electrolyte 30 has a radius of curvature which is substantially the same as that of the center portion 19 of each current collector; the convex side of the electrolyte is preferably oriented toward cathode chamber 34, and the current collectors are suitably oriented (upwardly convex in the drawing, toward the chamber in which the higher pressure will exist) so that they are spaced uniformly along their radii, from the electrolyte.

Between the electrolyte 30 and the two current collectors adjacent to it, i.e., immediately above and below it in the drawing, are defined a cathode chamber 34 and an anode chamber 36. As can be seen these are shell-like or watchglass-like spaces bounded by a current collector 18 on one side and by the electrolyte on the other. At their edges the chambers 34 and 36 are closed by the mounting rings 22. The anode material, e.g., sodium metal, is disposed in anode chamber 36 and may be carried on an electrode carrier material such as a conductive wool, mesh, or pad 38, e.g., chromium plated aluminum wool or a carbon felt, which is resistant to attack by the anode material. This provides more uniform conduction between the current collector and the electrolyte. As a safety precaution, a safety shield or protective mat 39 is preferably disposed in anode chamber 36, facially adjacent the surface of electrolyte 30. The use of a safety shield is conventional and desirable, but not required in Na/S cells, to minimize the rate of contact between the sulfur and the sodium metal if the electrolyte should crack. The shield can be made of a sodium-porous but flow-restricting material such as a compressed nickel plaque, and has a curvature similar to that of the electrolyte.

It should be noted that the anode cavity is preferably not completely filled; typically some space is left since the sodium metal cannot be compressed and, if it were too closely confined, could cause fracturing of the electrolyte during assembly or in thermal cycling.

The cathode material (sulphur in the preferred embodiment shown) is disposed in the cathode chamber 34 and is carried on a conductive porous pad or felt 40 of a material which is chemically inert but electrically conductive to the active material in the cathode chamber. The cathode should not fill the cathode chamber; some head space typically remains in each chamber, and some gas pressure is usually present in the space.

In discharge, cations are transferred from anode chamber 36, across electrolyte 30, to cathode chamber 34. This transfer depletes the amount of active material in the anode chamber and tends increasingly to fill the cathode chamber. Although the pad 40 in cathode chamber 34 may be compressible, the increasing volume of material in chamber 34 during discharge tends to increase the gas pressure in that chamber, simultaneously as the gas pressure in anode chamber 36 is decreasing, so that there exists an increasing pressure differential across the electrolyte. The magnitude of this force varies cyclicly in discharge and charging. It reaches its peak magnitude in deep discharge when the largest amount of cation transfer has occurred.

As previously indicated, intercell connector 16 has multiple functions; it closes anode chamber 36 of cell 12 (uppermost cell 12 in the drawing); it closes the cathode chamber 34 of cell 14 (the lower cell 14 in the drawing); and it provides electrical conduction between the two cells. To increase the voltage of the battery, other cells can be stacked on, each comprising a mounting ring, an electrolyte, and at least one current collector/intercell connector. Battery pole connectors 46, 46 are connected to the endmost current collectors. The battery may be contained in a cylindrical can or housing, not shown. An external heat control and insulation sleeve, which may be conventional and is not shown, is provided to maintain the correct temperature during operation.

In the embodiment shown, the edge flanges 20 of the current collectors project radially outward of the mounting rings 22, as designated at 42. This improves heat transfer into and out of the cells, which is desirable to improve the rate of heating and melting of the anode and/or cathode materials and to provide better cooling during discharge, if necessary.

The use of beta" (double prime) alumina as an electrolyte material is known, and the use of that material does not comprise the invention. (For further details of the manufacture of beta aluminum and beta" alumina, see Tilley, previously cited, at pages 20-25). The llectrolyte may be formed in the domed configuration by any of several methods such as slip casting, electrophoretic deposition, isotatic pressing and the like. The curvature of the electrolyte (and, similarly, of the current collectors) should approximate a chordal section of a sphere. While some deviation can be made from sphericity, mathematically the spherical section appears to have the greatest ability to withstand the pressure differential force across it.

It is contemplated that the electrolyte may be as big as 10" in diameter, or larger. In a preferred configuration, the electrolyte is 8in diameter with a radius of curvature of 8" and a thickness of 0.040"(measured on the axis at the center). The current collectors are 0.005-0.015" thick; the anode chamber is 0.100" thick; and the cathode chamber is 0.150" thick.

During assembly, the anode material can be placed in anode chamber 36 and the cavity sealed thereafter, as by laser heating of the sealing material while the current collectors are in thermal contact with a heat sink. Alternatively, the cell can be sealed empty in a furnace, and the sodium and sulphur charged into their respective chambers 36 and 34 through ports (not shown) that are subsequently closed.

Having described the invention, what is claimed is:

1. An electrochemical cell comprising, in sequential adjoining order,
   a first current collector,
   anode material contained in an anode chamber,
   a solid, ionically conductive ceramic electrolyte,
   cathode material contained in a cathode chamber, and
   a second current collector; and
   annular means surrounding and closing said anode and cathode chambers,
   said anode and cathode materials being electrochemically active during operation of the cell,
   said electrolyte formed of a ceramic material across which ions are transferred during discharge of the cell from one said chamber to the other said chamber,
   said electrolyte and first and second current collectors all being in the form of domed disks of substantially similar curvature,
   said electrolyte and current collectors being axially aligned but spaced apart, to present said chambers between them.

2. The cell of claim 1 wherein said annular means is a non-conductive ring which is positioned between said current collectors.

3. The cell of claim 2 wherein said first and second current collectors have planar peripheral flanges around them,
   each flange facially engaging and being sealed to said ring, said ring peripherally closing said anode and cathode chambers.

4. The cell of claim 3 wherein said flanges project outwardly of said ring and act as heat transfer fins.

5. The cell of claim 3 wherein said ring has a lip which projects inwardly, said electrolyte being seated against said lip.

6. The cell of claim 1 wherein said anode material is sodium and said cathode material is sulfur.

7. The cell of claim 1 wherein said electrolyte is made of beta double prime alumina.

8. The cell of claim 1 wherein said domed electrolyte is convex toward said cathode chamber.

9. The cell of claim 1 wherein at least one of said anode and cathode chambers contains an inert, electrically conductive electrode carrier material.

10. The cell of claim 1 wherein said current collectors are made of an electronically conductive ceramic material.

11. The cell of claim 10 wherein said current collectors are made of rutile.

12. The cell of claim 1 wherein said current collectors are made of corrosion resistant metal.

13. The cell of claim 1 wherein said current collectors are made of carbon or a carbon composite.

14. A bipolar battery comprising a stack of cells, each cell comprising in sequential adjoining order,
   a first current collector,
   anode material contained in an anode chamber, a solid electrolyte,
   cathode material contained in a cathode chamber, and
   a second current collector, and
   annular means surrounding and closing said anode and cathode chambers,
   said anode and cathode materials being electrochemically active and being liquid during operation of the cell,
   said electrolyte formed of a ceramic material across which cations are transferred during discharge of the cell from the anode chamber to said cathode chamber,
   said electrolyte and first and second current collectors all being in the form of domed disks of substantially similar curvature,
   said electrolyte and current collectors being axially aligned but spaced apart, to present said chambers between them,
   the second current collectors of some cells also being the first current collectors of adjacent cells and electrically connecting the adjacent cells in series.

15. The bipolar battery of claim 14 wherein said anode material is sodium, said cathode material is sulfur, and said solid electrolyte is beta double prime alumina.

* * * * *